United States Patent
Agarwal et al.

(10) Patent No.: US 10,387,416 B2
(45) Date of Patent: Aug. 20, 2019

(54) QUERYING A SPECIFIED DATA STORAGE LAYER OF A DATA STORAGE SYSTEM

(71) Applicant: Facebook, Inc., Menlo Park, CA (US)

(72) Inventors: Mayank Agarwal, Mountain View, CA (US); Dhrubajyoti Borthakur, Sunnyvale, CA (US); Nagavamsi Ponnekanti, Fremont, CA (US); Haobo Xu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 589 days.

(21) Appl. No.: 14/080,552

(22) Filed: Nov. 14, 2013

(65) Prior Publication Data

US 2015/0134692 A1    May 14, 2015

(51) Int. Cl.
*G06F 16/30* (2019.01)
*G06F 16/2455* (2019.01)

(52) U.S. Cl.
CPC ................. *G06F 16/2455* (2019.01)

(58) Field of Classification Search
CPC .............................. G06F 16/2455; G06F 16/30
USPC ........................................................ 707/769
See application file for complete search history.

(56) References Cited

U.S. PATENT DOCUMENTS

| | | | | |
|---|---|---|---|---|
| 5,907,837 A | * | 5/1999 | Ferrel | G06F 17/3089 |
| 2006/0072563 A1 | * | 4/2006 | Regnier | H04L 49/90 370/389 |
| 2009/0300643 A1 | * | 12/2009 | Gove | G06F 9/52 718/106 |
| 2011/0061062 A1 | * | 3/2011 | Chu | G06F 9/546 719/314 |
| 2012/0284663 A1 | * | 11/2012 | Driver | G06F 3/0485 715/784 |

* cited by examiner

*Primary Examiner* — Mahesh H Dwivedi
*Assistant Examiner* — Johnese T Johnson
(74) *Attorney, Agent, or Firm* — FisherBroyles, LLP (57) ABSTRACT

Technology is disclosed for retrieving data from a specific storage layer of a storage system ("the technology"). A query application programming interface (API) is provided that allows an application to specify a storage layer on which the query should be executed. The query API can be used in a multi-threaded environment which employs a combination of fast threads and slow threads to serve read/write requests from applications. The fast threads are configured to query on a first set of storage layers, e.g., storage layers in a primary storage, while the slow threads are configured to query on a second set of storage layers, e.g., storage layers in a secondary storage. If a fast thread does not find the requested data in the first set, the request is transferred to a slow thread and the fast thread is allocated to another request while the slow thread is serving the current request.

20 Claims, 9 Drawing Sheets

QUERYING A SPECIFIED DATA STORAGE LAYER OF A DATA STORAGE SYSTEM

TECHNICAL FIELD

Several of the disclosed embodiments relate to data retrieval, and more particularly, to retrieving data from a specified data storage layer of a data storage system.

BACKGROUND

In current data storage systems, e.g., database management systems, when a query is received to obtain data, the data storage system first checks the memory, e.g., a cache, for the requested data and if the data is not found in the cache, the data storage system then obtains the data from secondary storage, e.g., a disk. A disk access typically consumes a significant amount of time. Moreover, a computing resource used for obtaining the data from the disk can experience a delay until the data is read from the disk. This delay can have a significant impact on the efficiency of the overall system, especially in scenarios where there are large volumes of requests from applications to obtain data and, to satisfy impatient users, the data should be returned on an almost instantaneous basis. If the computing resources are occupied until the disk access operation is complete, the number of enqueued requests waiting to be served increases and the wait time of the requests also increases. Further, even in scenarios where some of the requests can be served by obtaining the data from the memory, the requests may have to wait longer since the computing resources are being used by requests for which data has to be obtained from the secondary storage. These delays can cause additional adverse effects on the efficiency of the system. Accordingly, current data storage systems are inefficient in managing data access requests.

DETAILED DESCRIPTION

Technology is disclosed for retrieving data from a specified data storage layer of a data storage system ("the technology"). Various embodiments of the technology provide a storage layer specific query application programming interface ("query API") that enables an application retrieving data from the storage system to specify a storage layer at which the query is to be executed. In some embodiments, the data storage system (also referred to herein as simply a "storage system") can be considered to be a tiered storage system, which is a storage system that has multiple logical data storage layers (hereinafter, "storage layers"). Some of the storage layers can include (a) storage layers in a primary storage (or non-persistent storage medium), e.g., a memory associated with the storage system and (b) storage layers in a secondary storage (or persistent storage medium), e.g., flash-based secondary storage, disk-based secondary storage etc. The layers in primary storage are said to be at "higher" layers than layers in secondary storage. The query API enables the application to restrict the execution of the query to specified storage layers. As an example, a component that requires data can transmit a query via the query API and specify a particular storage layer from which to retrieve the data. By executing the query at one or more specified storage layers, the consumption of computing resources for data read/write operations can be minimized because the data does not need to be retrieved or validated from "lower" layers.

In some embodiments, the query API can be used to enhance data retrieval efficiency in multithreaded applications. In one example, a server includes multiple threads that can serve requests, e.g., read/write, from various applications. The threads can include a set of fast threads and a set of slow threads. In some embodiments, the fast threads are configured to query on a first set of storage layers, e.g., storage layers in a primary storage, for which the response time of the query is less than a specified threshold, whereas the slow threads are configured to query on a second set of storage layers, e.g., storage layers of a secondary storage, for which the response time of the query is above the specified threshold. In some embodiments, if a fast thread does not find the requested data item in the primary storage layers, the request is transferred to a slow thread that obtains the data item from the secondary storage layer. The fast thread can then be allocated to serve another request while the slow thread is servicing the current request. The fast threads can have an expected response time that is less than the slow threads.

In some embodiments, the query API can be used to reduce or minimize redundant read/write operations, e.g., delete operations. In one such example, an application generates delete instructions for deleting various data items from the secondary storage of the storage system. These instructions can be stored in an instruction list that is executed by a server that operates in connection with the application. The server can verify if the data items exist in the secondary storage layers by querying a storage layer in a primary storage before executing the delete instructions. For each of the data items in the instruction list, the server can determine whether keys associated with particular data items can exist in the secondary storage by querying a filter in the primary storage. If the filter determines that a key for a particular data item cannot exist in the secondary storage, the server removes the delete instruction for that particular data item from the instruction list, thereby preventing the execution of a redundant delete operation. A delete operation can be redundant when, e.g., the data item to be deleted has already been previously deleted and so does not exist in the secondary storage.

Environment

Figure 1:
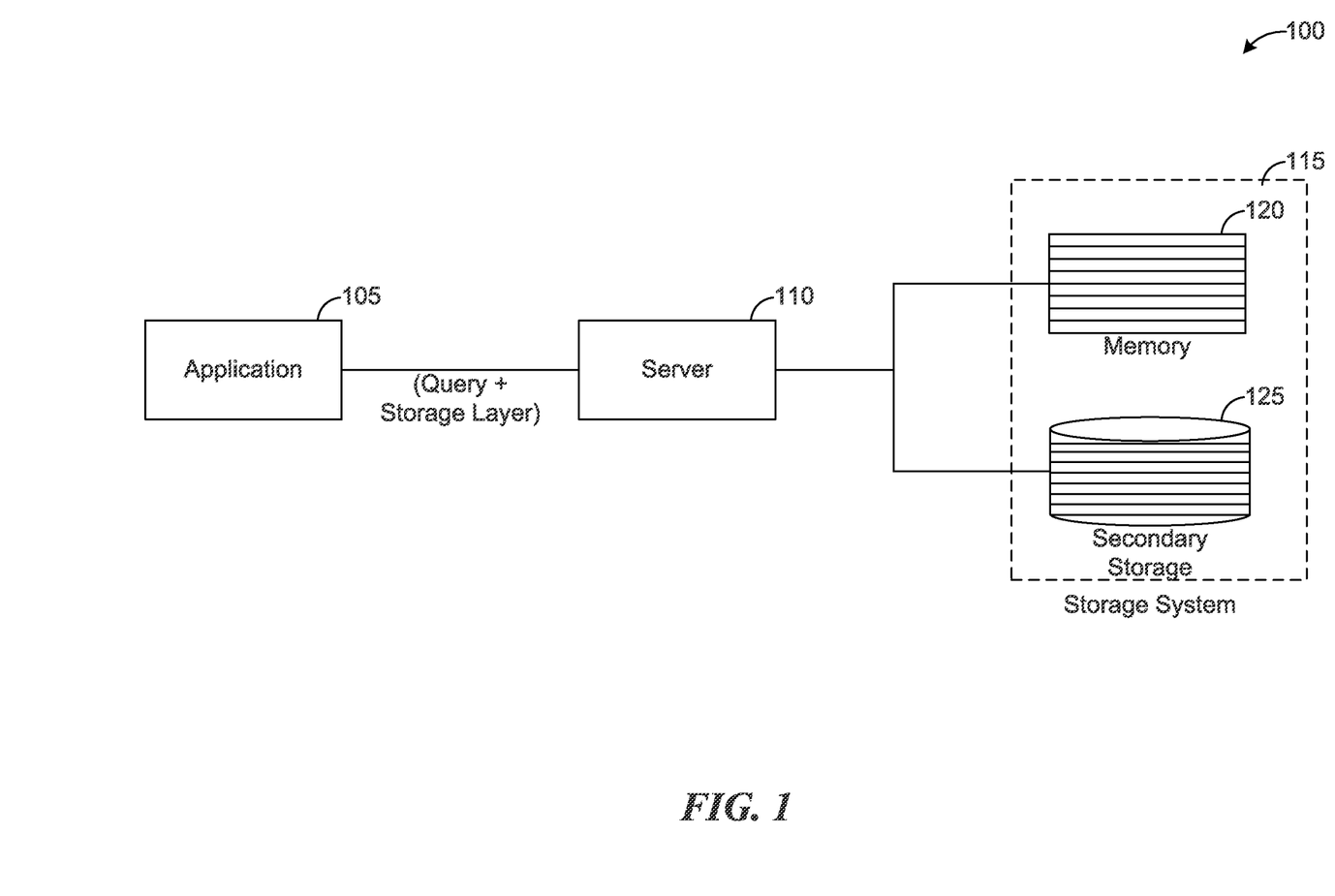
FIG. 1 is a block diagram illustrating an environment in which a storage layer specific query application programming interface (API) can be implemented.

FIG. 1 is a block diagram illustrating an environment in which a storage layer specific query API (hereinafter "query API") can be implemented. The query API may be used to perform various data access operations on a storage system 115 in the system 100. Examples of data access operations are read, write, insert, modify, delete, etc. The storage system 115 can store data associated with application 105. The application 105 can perform data access operations on the data stored at the storage system 115. A server 110 facilitates the read/write operations of the application 105 on the storage system 115. The application 105, server 110 and the storage system 115 may communicate with each other over various types of communication networks.

Figure 2:
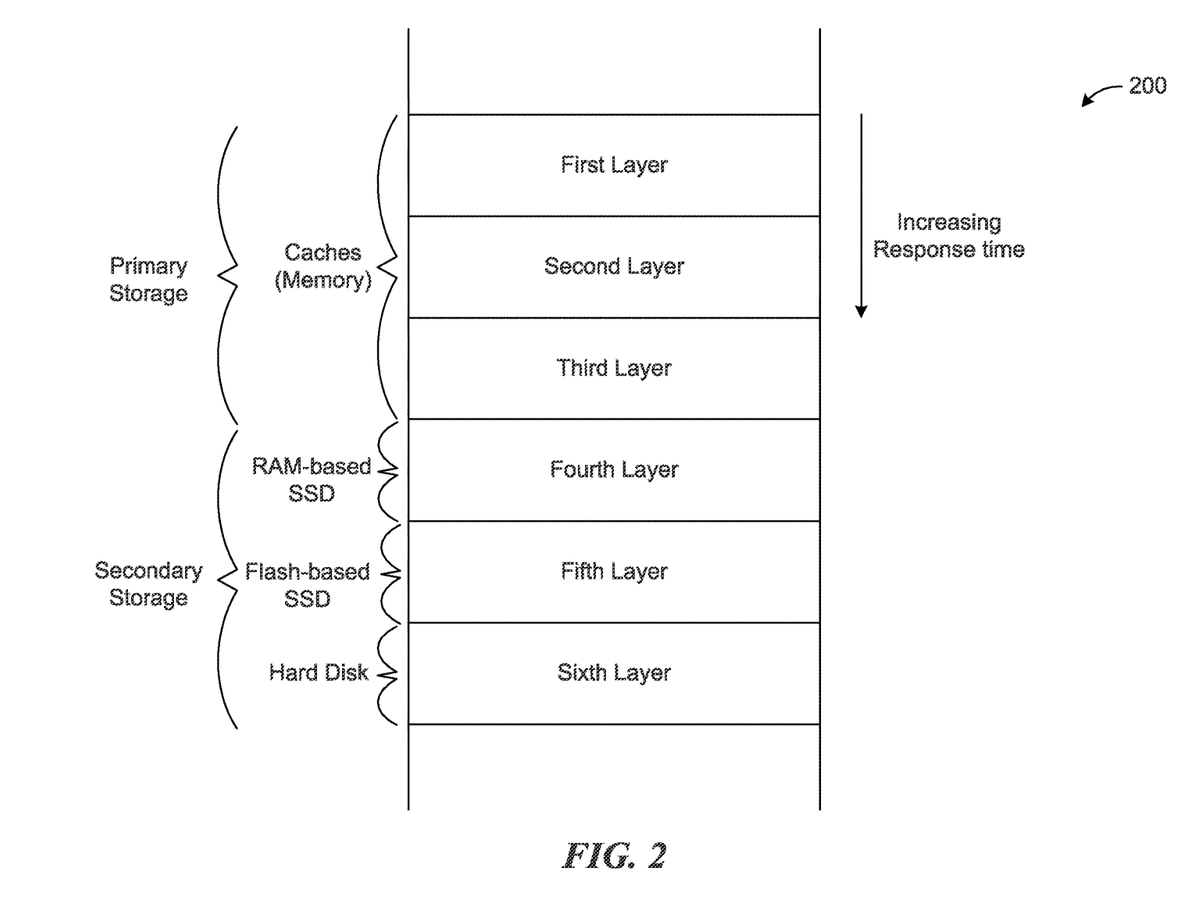
FIG. 2 is a block diagram illustrating various logical storage layers of a storage system, consistent with various embodiments of the disclosed technology.

The storage system 115 for the application 105 can include various storage layers. FIG. 2 is a block diagram illustrating various logical storage layers 200 of a storage system, consistent with various embodiments. In some embodiments, the storage layers 200 can be layers of the storage system 115. The storage system 200 includes a number of storage layers, some of which can be in a primary storage of the storage system and others in the secondary storage of the storage system. For example, the "First Layer," "Second Layer" and "Third Layer" are part of the primary storage, e.g., random access memory (RAM); and the "Fourth Layer," "Fifth Layer" and "Sixth Layer" are part of the secondary storage. Further, in some embodiments, the "Fourth Layer" can be part of a secondary storage such as battery powered RAM-based solid state drive (SSD), the "Fifth Layer" can be part of a flash-based SSD and the "Sixth Layer" can be part of a hard disk drive.

In the illustrated storage system, the "First Layer" is at the top of the storage layer hierarchy and the "Sixth Layer" is at the bottom of the storage layer hierarchy with "Second Layer", "Third Layer" "Fourth Layer," "Fifth Layer" between the top and the bottom. The "First Layer" is said to be "higher" than the "Second Layer," and the "Fifth Layer" is said to be "lower" than the "Fourth Layer." The response times of a query performing a read/write operation on different storage layers can be different, at least partly because of a storage medium which a particular storage layer is associated. For example, the response time of a query performing a read/write operation on data in the storage layers in the memory is less than the response time of the same query performing a read/write operation on the data in the storage layers in the secondary storage. Further, even within a particular storage medium, the response times may be different for different storage layers. For example, a response time for a query executing on a RAM-based SSD, a flash-based SSD, or a hard disk secondary storage can increase in that order. The response time generally increases as the query traverses from top of the storage layer hierarchy (e.g., the "First Layer") to the bottom of the storage layer hierarchy (e.g., the "Sixth Layer"). In some embodiments, the query API enables the application to execute the query on one or more of the layers.

Although FIG. 2 illustrates a storage system 200 having six storage layers spread across four different storage mediums, a person having ordinary skill in the art will readily understand that the technology disclosed herein can be applied to a storage system having more or fewer storage layers and spread across more or fewer number of storage mediums.

Referring back to FIG. 1, the storage layers of the storage system 115 can include (a) one or more storage layers that are part of a secondary storage 125 at which the data items associated with the application 105 are stored and/or (b) one or more storage layers that are part of a primary storage, e.g., memory 120 of the server 110. In some embodiments, the memory 120 acts as a cache for caching the data items stored at the secondary storage 125. In some embodiments, the memory 120 can include multiple caches, and the caches can correspond to various storage layers. In some embodiments, the secondary storage 125 can include one or more of RAM (with power backup) based SSD, a flash-based SSD, a hybrid SSD, a hard disk drive, a magnetic tape, a compact disc, magnetic cassettes, or any other computer storage medium which can be used to persistently store the desired information. Further, in some embodiments, each of these secondary storages can form one or more storage layers.

The application 105 can perform a read/write operation, e.g., read operation, on the storage system 115 using a query API. In some embodiments, the application 105 also specifies in the query API a storage layer from which the data should be obtained. The server 110 executes the query on the particular storage layer, which can be in memory 120 or the secondary storage 125, and returns the data accordingly. In some embodiments, by restricting the execution of a query to a particular storage layer, e.g., a storage layer in memory, a read/write access to the secondary storage 125 which typically consumes more computing resources can be prevented and requests from the application 105 can be served faster. Such a query API that can target the execution of a query to a particular storage layer can be used in many scenarios. Examples of such scenarios are described at least with reference to FIGS. 3-7.

Figure 3:
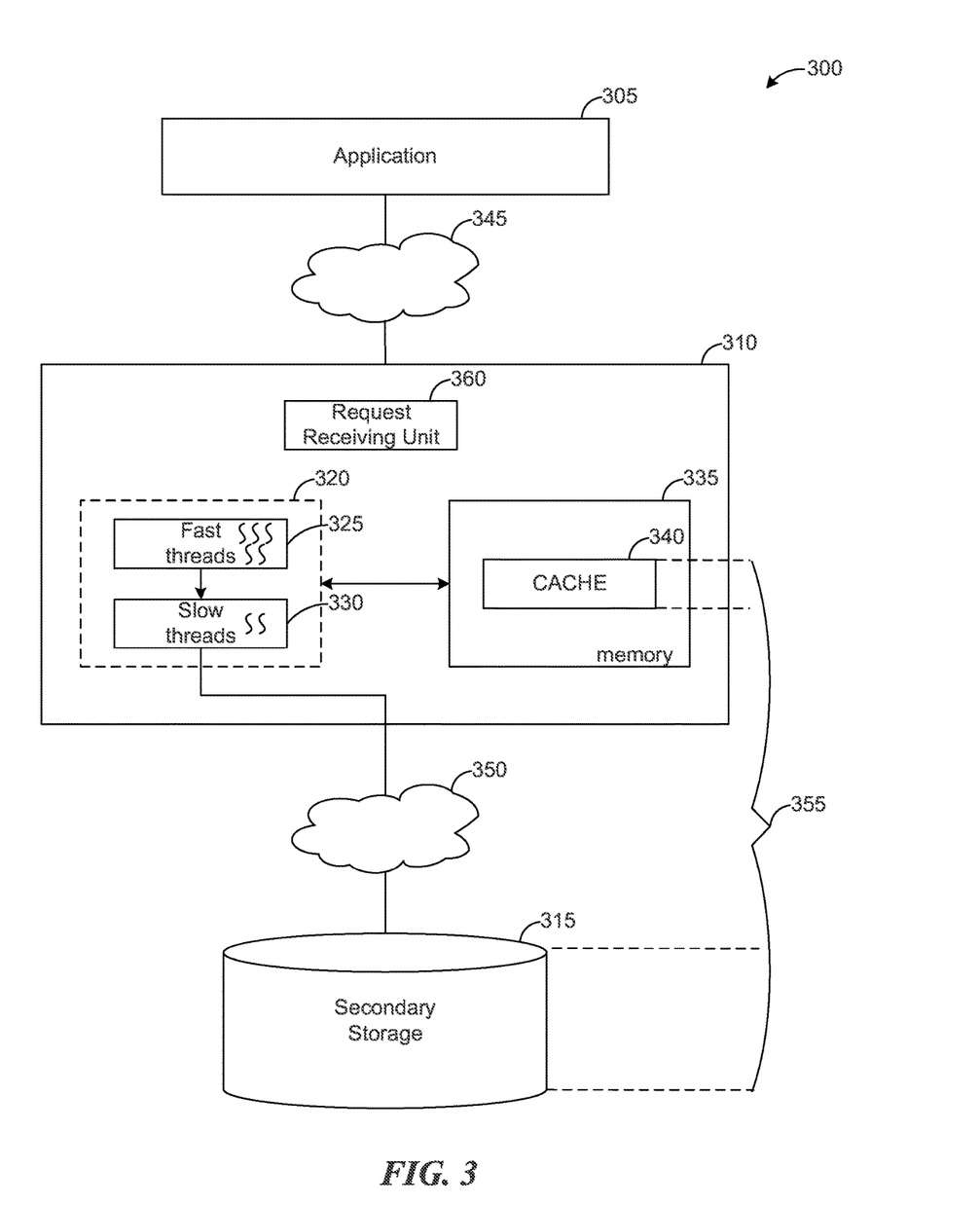
FIG. 3 is a block diagram of a system for serving read/write requests from applications using a storage layer specific query API, consistent with various embodiments of the disclosed technology.

FIG. 3 is a block diagram of a system 300 for serving read/write requests from applications using a storage layer specific query API, consistent with various embodiments. In some embodiments, the system 300 can be similar to the system 100 of FIG. 1. One or more applications 305 can generate requests for obtaining data items from the storage system 355. A server 310 responds to the requests by obtaining the requested data items from one or more storage layers of the storage system 355 and returning the data items to the application 305.

In some embodiments, the server 310 is a multi-threaded server having a number of threads for serving read/write requests from various applications, including application 305. A thread is a part of a computer program that can execute independently of other parts. A thread of execution is the smallest sequence of programmed instructions that can be managed independently by an operating system scheduler. Multithreading enables programmers to design programs whose threaded parts can execute concurrently. Multiple threads can exist within the same process and share resources, e.g., memory, while different processes do not share these resources. Multi-threading enables multiple threads to exist within the context of a single process.

For example, if the server 310 has five threads, the server 310 can service five requests almost simultaneously. The five threads can access or share the resources, e.g., a memory 335 of the server 310 and a secondary storage 315. When a read request arrives at the request receiving unit 360 of the server 310 from the application 305, the server 310 selects a thread from a thread pool 320 based on a predefined criteria, e.g., a thread which is free, and assigns the request to the selected thread. The thread executes the query using the query API and obtains the requested data items from one or more storage layers of the storage system 355.

In some embodiments, the thread pool 320 of the server 310 includes a set of fast threads 325 and a set of slow threads 330 that serve requests from the applications, e.g., application 305. While the fast threads 325 are expected to return the requested data items within a predefined, specified, expected or agreed-upon amount of time ("time constraint"), the slow threads 330 are not subjected to such time constraints. The fast threads 325 are expected to return the data items within the time constraint and proceed to accept the next set of requests from the applications. In some embodiments, to return the data within the time constraint, a fast thread is configured to execute the query on storage layers for which a response time of the query is below a predefined threshold, e.g., storage layers in the memory 335 of the server 310. If the data items are not found in those storage layers, the fast thread transfers the request to a slow thread and proceeds to accept a next request. The slow thread can then execute the query on some or all of the storage layers of the storage system 355, including storage layers in the secondary storage 315, and return the data items to the requesting application.

Figure 4:
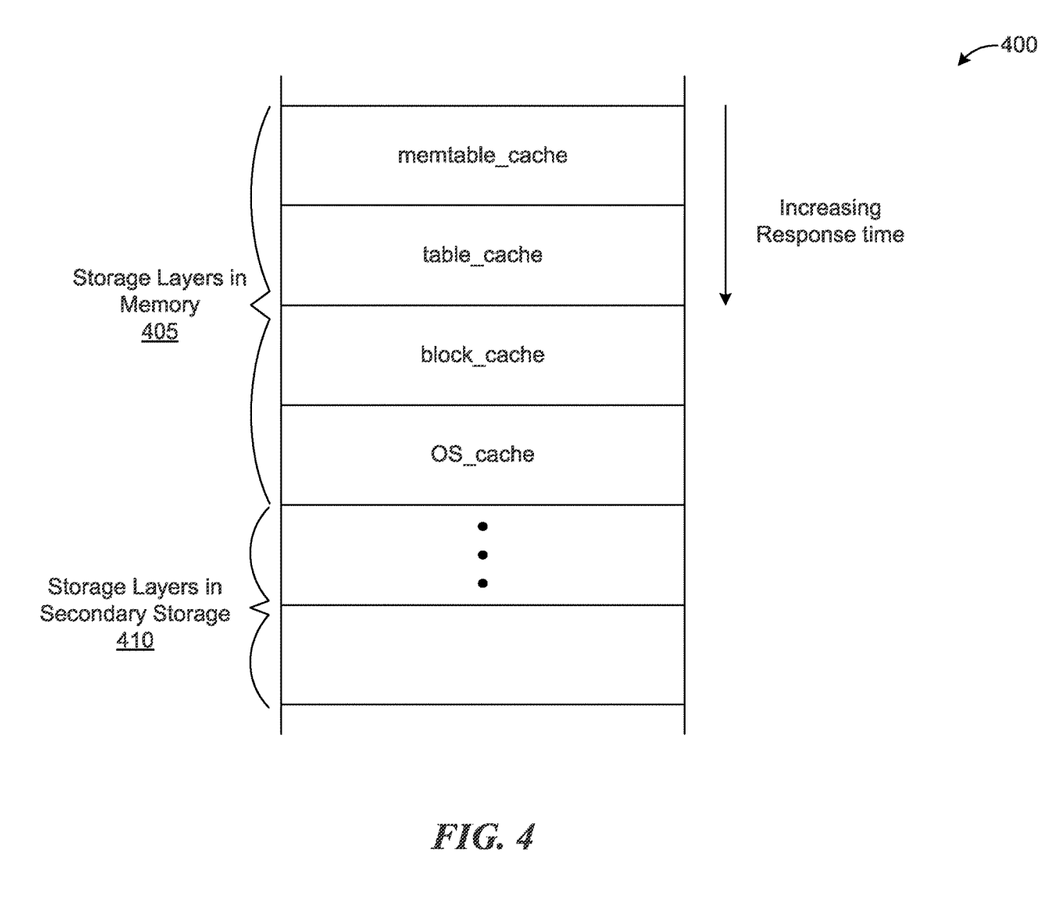
FIG. 4 is a block diagram illustrating an example implementation of the storage system of FIG. 3, consistent with various embodiments of the disclosed technology.

In some embodiments, the storage layers that the fast threads 325 are configured to query can be configurable. FIG. 4 is a block diagram illustrating an example implementation 400 of the storage system 355, consistent with various embodiments. In some embodiments, the example 400 is an implementation of a LevelDB storage library (or other database) that stores data items as key-value pairs. In the example implementation 400, the storage system 355 includes storage layers from the memory 335 of the server 310 and the secondary storage 315. The storage layers 405 can be in the memory 335 and the storage layers 410 can be in the secondary storage 315. The storage layers 405 can include data structures, e.g., "Memtable," "table_cache", "block_cache," "os_cache," etc. that can be used as a cache 340 to temporarily store at least a portion of the data items that are stored at one or more storage layers 410 of the secondary storage 315. In some embodiments, the secondary storage 315 can include one or more of RAM (with power backup) based SSD, a flash-based SSD, a hybrid SSD, a hard disk drive, a magnetic tape, a compact disc, magnetic cassettes, or any other computer storage medium which can be used to persistently store the desired information.

In some embodiments, each of the data structures in the memory 335 can act as a specific storage layer, with the "Memtable" being on the top of the hierarchy and the "hard disk" storage layer being at the bottom of the hierarchy. Typically, obtaining data from a memory, e.g., RAM, is much faster than obtaining from a secondary storage, e.g., a hard disk or even an SSD. Accordingly, the fast threads 325 can be configured to execute the queries, e.g., read requests from the applications, on the storage layers 405 in the memory 335.

The query API includes a storage layer parameter that accepts one or more storage layers on which the query is to be executed. The fast threads 325 are configured to invoke the query API with the storage layer parameter set to one or more storage layers in the memory 335.

The application 305 generates a request for obtaining a particular data item. The request includes a key associated with the data item. The application 305 can also indicate if the request is a high priority request, e.g., data has to be obtained within a predefined amount of time. The request receiving unit 360 at the server 310 receives the request. If the request is a high priority request, the request receiving unit 360 assigns the request to one of the fast threads 335. A fast thread determines whether a key associated with the data item exists in any of the storage layers of the memory 335. If the key is found in the memory 335, the key and the value associated with the key are obtained from the memory 335 and returned to the application 305. If the key is not found in any of the storage layers in the memory 335, the fast thread transfers the request to one of the slow threads 330 and proceeds to service a next high priority request assigned by the request receiving unit 360. The slow thread, upon receiving the request from the fast thread, executes the query on some or all the storage layers of the storage system 355, including the storage layers of the secondary storage 315, obtains the data item using the key included in the request and returns the data item to the requesting application.

In some embodiments, if the fast thread does not transfer the request to a slow thread and is occupied until the data item is obtained from the secondary storage 315, the number of high priority requests waiting to be serviced can increase, which results in longer wait times for the applications to obtain the data.

It should be noted that the order of the storage layers indicated in the example implementation 400 of the storage system 355 is one of many possible orders. However, regardless of order, it should be noted that the response time of a query increases as the query traverses from top of the storage layer hierarchy to the bottom of the storage layer hierarchy. Further, the fast threads 325 are described as being configured to execute the query on storage layers of memory 335 as one of many possible configurations. However, the fast threads can be configured to execute the query on any storage layer from which the data can be obtained in a predefined amount of time. For example, in scenarios where the secondary storage includes a combination of flash-based SSD, RAM-based SSD, hard disk, obtaining data from storage layers of flash-based SSD or RAM-based SSD (but not from the hard disk) may be considered to be in the predefined amount of time. Accordingly, the fast threads 325 can be configured to execute on those storage layers as well in addition to the memory.

Figure 5:
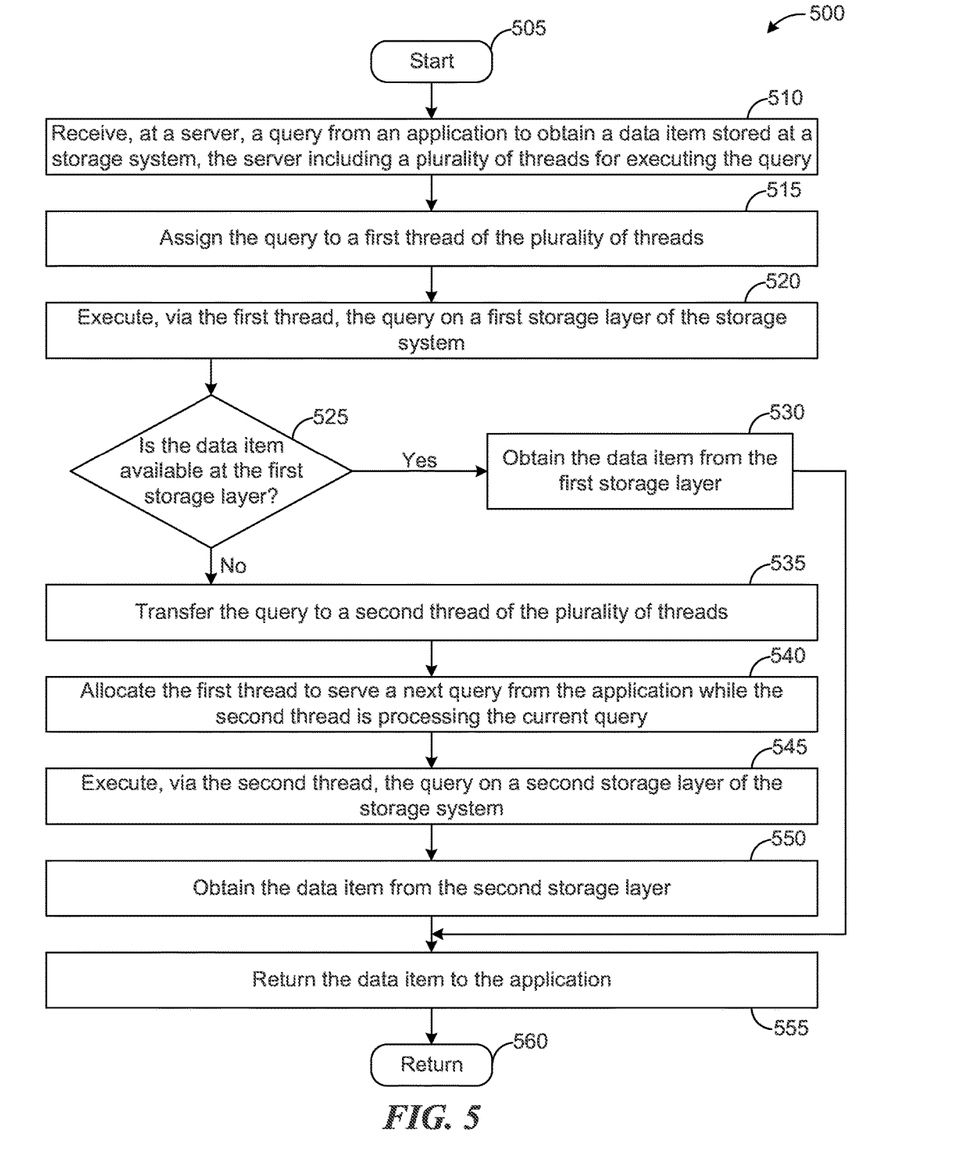
FIG. 5 is a flow diagram of a process for obtaining data items using a storage specific query API, consistent with various embodiments of the disclosed technology.

FIG. 5 is a flow diagram of a process 500 for obtaining data items using a storage specific query API, consistent with various embodiments. The process 500 may be executed in a system such as system 300 of FIG. 3. The process 500 begins at block 505, and at block 510, the request receiving unit 360 of the server 310 receives a request, e.g., a read request including a query to obtain a particular data item stored at a storage system, from an application. In some embodiments, the data items may be stored as key-value pairs in the storage system. The request includes a key associated with the particular data item. The request can also include a priority for the request, e.g., high priority, low priority etc. In some embodiments, a high priority request may indicate that the application requires the data item within a predefined amount of time. At block 515, the request receiving unit 360 assigns the request to one of the threads at the server 310. In one example, the request can be assigned to a fast thread if the request is a high priority request. In another example, the request can be assigned to a fast thread by default, that is, regardless of whether the request is a high priority request.

At block 520, the fast thread executes the query on a first storage layer. In some embodiments, the first storage layer can include one or more storage layers, e.g., storage layers in a memory of the server 310, from which the particular data item can be obtained within the predefined amount of time. At decision block 525, the fast thread determines whether the data item is available at the first storage layer. In some embodiments, determining whether the particular data item is available at the first storage layer includes determining whether the key associated with the particular data item is available at the first storage layer. At block 530, if the fast thread finds the key in the first storage layer, the fast thread retrieves the key and the associated value from the first storage layer and continues at block 555. At block 555, the server 310 returns the data item to the requesting application, and the process returns at step 560.

Referring back decision block 525, if the fast thread does not find the key in the first storage layer, at block 535, the fast thread transfers the request to another thread, e.g., a slow thread to obtain the data from the second storage layer, e.g., storage layers of a secondary storage 315 of the storage system 355. In some embodiments, the secondary storage 315 can include one or more of RAM (with power backup) based SSD, a flash-based SSD, a hybrid SSD, a hard disk drive, a magnetic tape, a compact disc, magnetic cassettes, or any other computer storage medium which can be used to persistently store the desired information.

At block 540, the request receiving unit 360 allocates the fast thread to a next request from one or more applications while the slow thread is in the process of obtaining the data item from the second storage layer. At block 545, the slow thread executes the query on the second storage layer and, at block 550, the slow thread obtains the key and the associated value from the second storage layer. At block 555, the server 310 returns the data item to the requesting application, and the process returns at block 560.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

Figure 6:
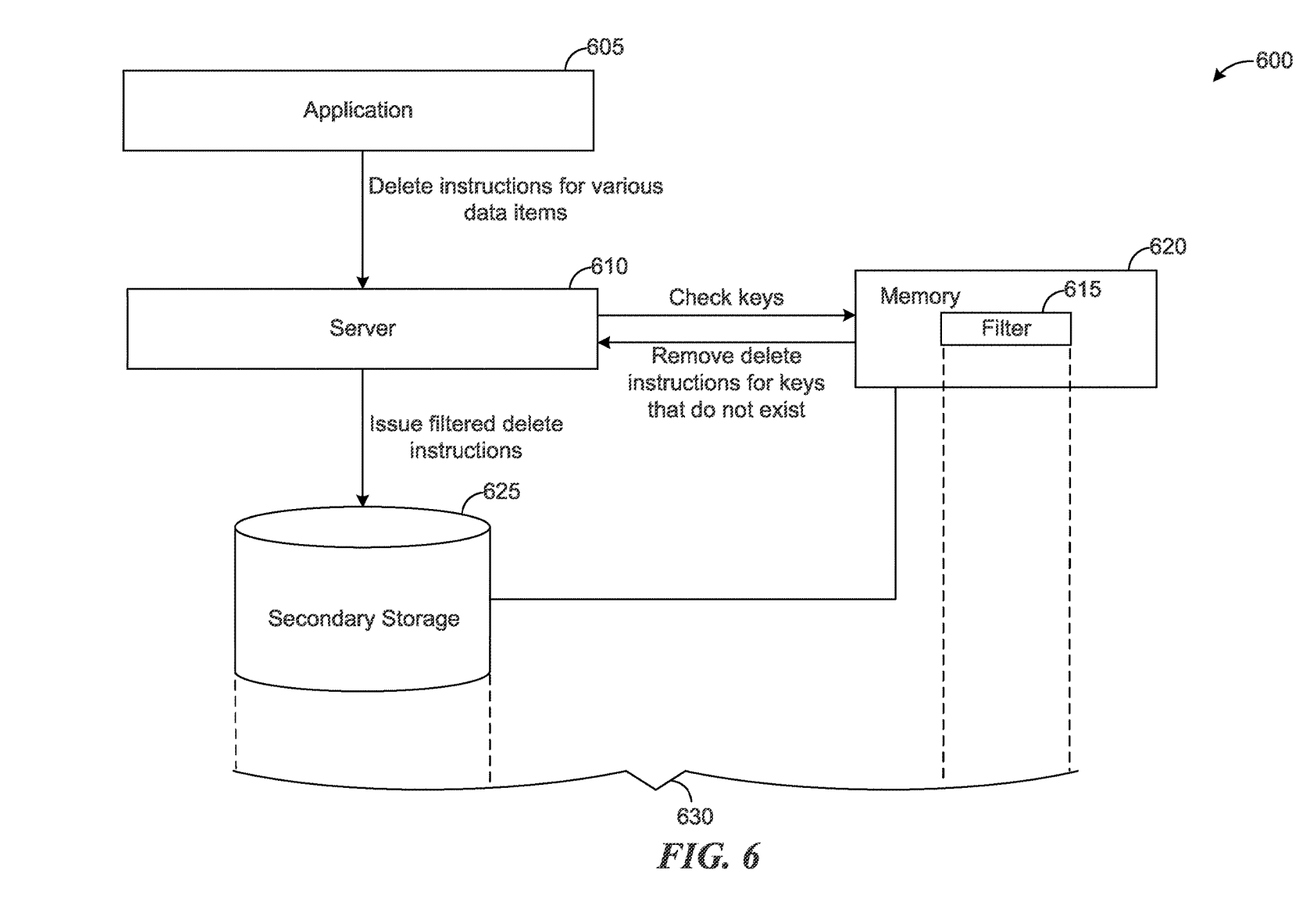
FIG. 6 is a block diagram of a system for filtering delete instructions using storage specific query API, consistent with various embodiments of the disclosed technology.

FIG. 6 is a block diagram of a system 600 for filtering delete instructions using a storage specific query API, consistent with various embodiments. In some embodiments, the system 600 can be similar to the system 100 of FIG. 1, application 605 to application 105, server 610 to server 110, and storage system 630 to storage system 115. The storage layers of the storage system 630 can spread across a memory 620, e.g., RAM, of the server 610 and a secondary storage 625. In some embodiments, the secondary storage 625 can include one or more of RAM (with power backup) based SSD, a flash-based SSD, a hybrid SSD, a hard disk drive, a magnetic tape, a compact disc, magnetic cassettes, or any other computer storage medium which can be used to persistently store the desired information.

The application 605 generates delete instructions (also referred to as a "source instruction set" or "instruction list") for deleting various data items from the secondary storage 625 of the storage system 630. However, in some embodiments, some of the data items for which the delete instructions are generated may not exist in the storage system 630. Accordingly, some of the delete instructions in the source instruction set may be redundant. By filtering (or removing) these redundant delete instructions, the computing resources that would have otherwise been consumed for the execution of these redundant delete instructions may be saved.

In some embodiments, in order to filter the redundant delete instructions, the server 610 checks with a filter 615 in the memory 620 of the server 610 to determine whether a key associated with a particular data item can exist in the secondary storage 625. In some embodiments, the server 610 uses the storage layer specific query API to execute such a query on the filter 615. The storage layer parameter of the query API can be set to the filter 615.

The filter 615 determines a probability of existence of the key at the secondary storage 625. The filter 615 may indicate the probability in a variety of ways. In some embodiments, a logical true, "1," "No" or "does not exist" returned by the filter 615 indicates that the key does not exist in the secondary storage 625, whereas a logical false, "0," "Yes" or "may exist" may indicate that the filter 615 is not able to determine with certainty whether or not the key exists in the secondary storage 625. It should be noted that the filter 615 does not access the secondary storage 625 for making such a determination. If the filter 615 indicates that the key does not exist, the server 610 removes the delete instruction for the particular data item from the source instruction set. If the filter 615 indicates that they key may or may not exist, the server 610 retains the delete instruction for the particular data item.

The server 610 continues to make a similar determination for all the data items from the source instruction set, and removes any redundant delete instructions from the source instruction set to generate a filtered set of delete instructions. The server 610 executes the filtered set of delete instructions at the secondary storage 625.

Figure 7:
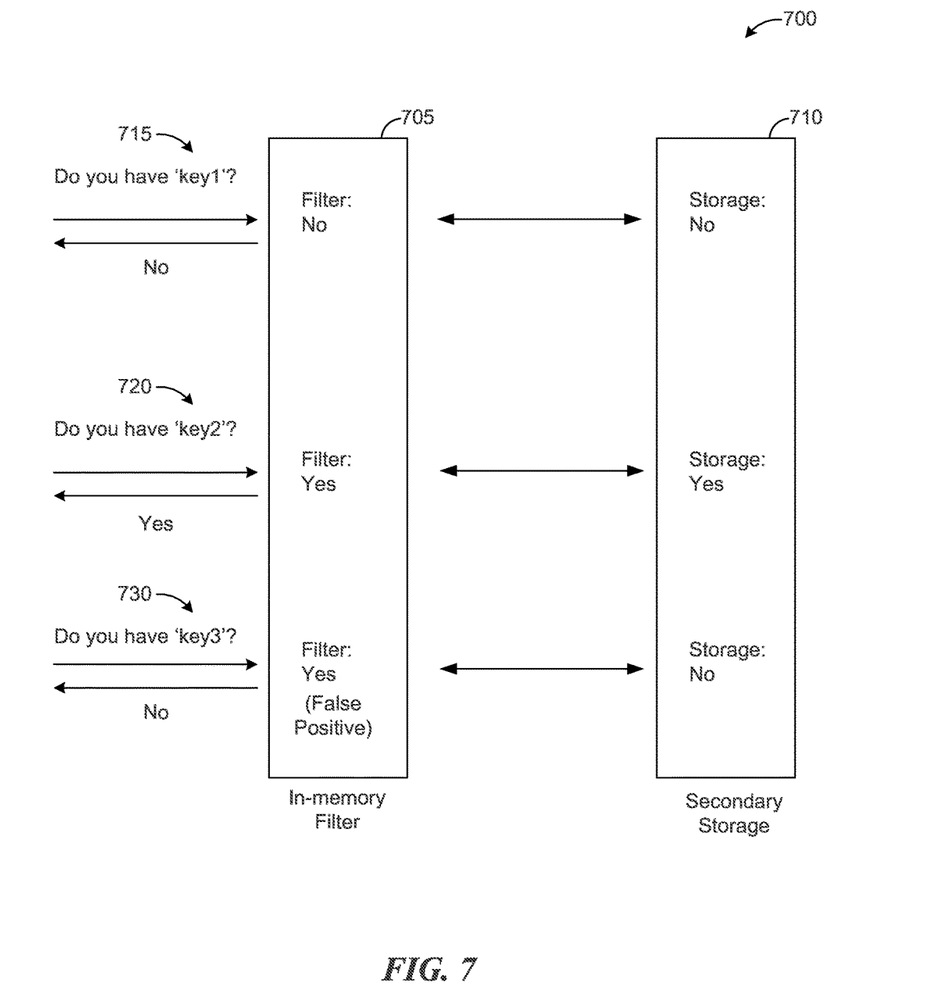
FIG. 7 is an example illustration a filter implemented based on a bloom filter data structure to determine whether a key does not exist in a storage system, consistent with various embodiments of the disclosed technology.

Referring back to the filter 615, the filter 615 can be implemented using various techniques to determine whether a particular key exists at the secondary storage. In some embodiments, the filter 615 can be implemented based on a bloom filter which is a data structure used to test whether an element is a member of a set. FIG. 7 is an example 700 illustrating the working of filter 615 implemented based on a bloom filter, consistent with various embodiments. The filter 705 is similar to filter 615 and is implemented based on a bloom filter data structure. The storage 710 is similar to the secondary storage 625.

In some embodiments, a bloom filter can be used to speed up look-up operations in a key-value storage system, e.g., storage system 630. The bloom filter decisions are typically faster than accessing the secondary storage 710. The bloom filter typically determines the non-existence of a member in a set with certainty than the existence of the member. That is, when the bloom filter determines that the member does not exist in the set, the requesting application can be certain that the member does not exist in the set. However, in some embodiments, the bloom filter may not be able to determine with certainty as to whether the member exists in the set. In such cases, the member may or may not exist in the set.

The example 700 illustrates various scenarios in which the filter 705 determines whether the keys "key 1," "key 2" and "key 3" exist in the secondary storage 710. The secondary storage 710 contains "key 2" but not keys "key 1" and "key 3." In the scenario 715, in response to a query for "key 1," the filter 705 returns a "No". That is, the filter 705 determines with certainty that "key 1" does not exist at the secondary storage 710. In the scenario 720, in response to a query for "key 2," the filter 705 returns a "Yes" value. That is, the filter 705 is not certain as to whether or not "key 2" exists in the secondary storage 710. However, in scenario 720, the secondary storage 710 contains "key 2." Similarly, in the scenario 730, in response to a query for "key 3," the filter 705 returns a "Yes". That is, the filter 705 is not certain as to whether or not "key 3" exists in the secondary storage 710. However, in scenario 730, the secondary storage 710 does not contain "key 2." Thus, when the filter 705 determines that the key does not exist, it is certain that the key does not exist in the secondary storage 710.

In some embodiments, the filter 705 can learn of the existence or non-existence of a set of keys when the data items with which the set of keys are associated are inserted into or deleted from the secondary storage 710.

Referring back to FIG. 6, when the filter 615 determines that a key for a particular data item does not exist in the secondary storage 625, the delete instruction for the particular data item is removed from the source instruction set. However, when the filter 615 is not able to determine with certainty that the key for the particular data item does not exist (determined as the key "may exist") in the secondary storage 625, the delete instruction for the particular data item is retained in the source instruction set.

Figure 8:
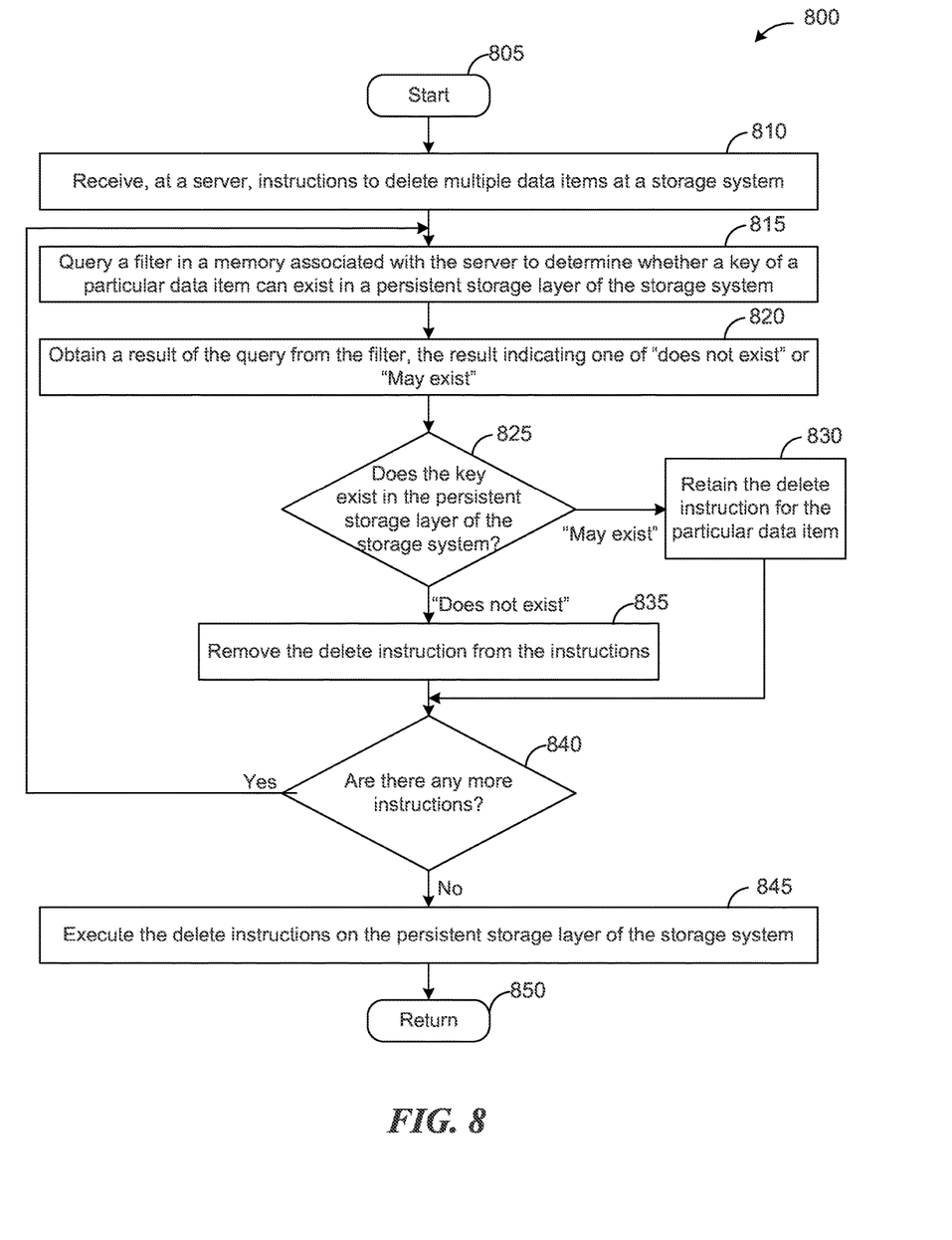
FIG. 8 is a flow diagram of a process for filtering redundant delete instructions using a storage layer specific query API, consistent with various embodiments of the disclosed technology.

FIG. 8 is a flow diagram of a process 800 for filtering redundant delete instructions using a storage layer specific query API, consistent with various embodiments. In some embodiments, the process 800 may be implemented in a system such as system 600 of FIG. 6. The process 800 begins at block 805, and at block 810, the server 610 receives a set of delete instructions from an application, e.g., application 605, for deleting various data items stored at a secondary storage 625 of storage system 630. In some embodiments, the data items are represented as key-value pairs in the secondary storage system 625. At block 815, the server 610 queries a primary storage, e.g., memory 620 of the server 610, to determine whether a key associated with a particular data item for which a delete instruction is generated exists in the secondary storage 625. In some embodiments, the server 610 may query a filter, e.g., filter 615 in the memory 620 that determines a probability of existence of the key in the secondary storage 625.

At block 820, the server 610 obtains a result of the determination from the filter 615. In some embodiments, the result from the filter 615 can indicate that (a) the key does not exist in the secondary storage 610 or (b) the key may exist, that is, the filter 615 is not able to determine with certainty as to whether or not the key exists in the secondary storage 610. At decision block 825, the server 610 determines if the result indicates that key does not exist in the secondary storage 625. Responsive to a determination that the result indicates that the key may exist in the secondary storage 625, at block 830, the server 610 retains the delete instruction for the particular data item and proceeds to block 840.

On the other hand, responsive to a determination that the key does not exist in the secondary storage 625, at block 835, the server 610 removes the delete instruction for the particular data item from the set of delete instructions. At decision block 840, the server 610 determines if there are any more instructions to be processed from the set of delete instructions generated by the application. Responsive to a determination that there are more delete instructions to be processed, the server 610 continues to process the next delete instruction at block 815. On the other hand, responsive to a determination that there are no more delete instructions to be processed, at block 845, the server 610 executes the filtered set of delete instructions on the secondary storage system 625, and the process 800 returns at 850.

Figure 9:
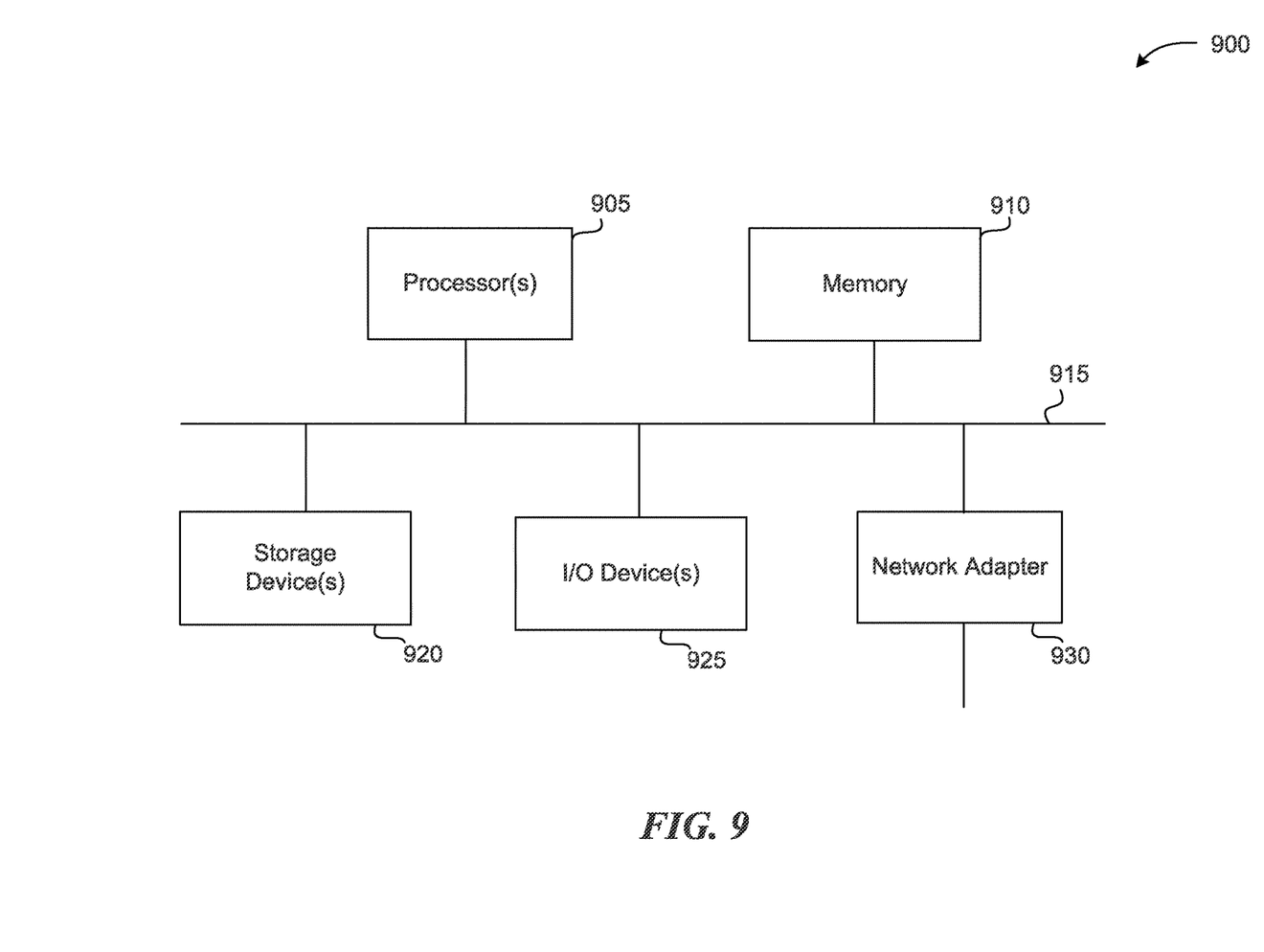
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing device, comprising:
   receiving, at a server, a query to obtain a data item stored at a data storage system, the server having multiple threads for executing the query;
   determining, at the server, whether to assign the query to a first thread of the multiple threads or a second thread of the multiple threads based on a storage layer specified in the query, wherein the first thread is restricted to executing the query on a first set of storage layers for which a response time of the query is below a predefined threshold and the second thread is restricted to executing the query on a second set of storage layers for which the response time of the query is higher than the predefined threshold;
   assigning, by the server, the query to the first thread based on data of the query specifying a storage layer of the first set of storage layers of the data storage system;
   determining, by the first thread, that the data item does not exist at the first set of storage layers; and
   responsive to a determination that the data item does not exist at the first set of storage layers, transferring, from the first thread, the query to the second thread, the second thread executing the query to retrieve the data item from the second set of storage layers of the data storage system that is different from the first set of storage layers from which the first thread is configured to retrieve the data item, wherein the second thread is different from the first thread.

2. The method of claim 1, wherein the first set of storage layers include a non-persistent storage layer of the data storage system.

3. The method of claim 1, wherein the second set of storage layers includes a persistent storage medium of the data storage system.

4. The method of claim 1, wherein obtaining the data item from the first set of storage layers consumes less time than obtaining the data item from the second set of storage layers.

5. The method of claim 1, wherein the first thread is configured to have a first response time and the second thread is configured to have a second response time, the first response time being less than the second response time, the first response time or the second response time being a time taken by the server to return the data item to an application that transmitted the request from when the query is executed.

6. The method of claim 1, wherein executing the query on the first set of storage layers or the second set of storage layers includes invoking, by the server, an application programming interface (API) of the data storage system to obtain the data item, the API including a parameter for specifying a storage layer of the data storage system on which the query is to be executed.

7. The method of claim 6, wherein executing the query on the first set of storage layers includes:
   invoking, by the first thread, the API with the parameter set to the first set of storage layers.

8. The method of claim 6, wherein executing the query on the second set of storage layers includes:
   invoking, by the second thread, the API with the parameter set to the second data set of storage layers.

9. The method of claim 6, wherein executing the query on the second set of storage layers includes:
   executing, by the first thread, the query on the first set of storage layers, and
   executing, by the second thread, the query on the second set of storage layers if the data item does not exist at the first set of storage layers.

10. The method of claim 1 further comprising:
    responsive to a determination that the data item exists at the first set of storage layers, obtaining, by the first thread, the data item from the first set of storage layers; and
    returning, by the server, the data item to an application that transmitted the request.

11. The method of claim 1, wherein the data item is represented as a key-value pair and the query includes a key of the key-value pair.

12. A computer-readable storage memory storing instructions, comprising:
    instructions for receiving, at a server in a computing system and from an application, a first request to obtain a data item of multiple data items stored at a storage system, the first request including a key associated with the data item, the server including a first thread and a second thread for obtaining the data item, wherein the second thread is different from the first thread, the first thread is restricted to executing the first request on a first set of storage layers for which a response time of the first request is below a predefined threshold, and the second thread is restricted to executing the first request on a second set of storage layers for which the response time of the first request is higher than the predefined threshold;

instructions for assigning the first request to the first thread, wherein the assigning includes determining to assign the first request to the first thread based on data from the first request specifying a storage layer of the first set of storage layers;

instructions for determining, by the first thread and in response to the first request, that the data item does not exist in in memory cache of the first set storage layers of the storage system;

instructions for transferring, by the first thread and in response to a determination that the key does not exist in the in-memory cache, the first request to the second thread to obtain the data item from a persistent storage medium of the second set of storage layers of the storage system; and instructions for allocating, by the server, the first thread to serve a second request from the application while the second thread is processing the first request.

13. The computer-readable storage memory of claim 12, wherein the data items are represented as multiple key-value pairs.

14. The computer-readable storage memory of claim 12, wherein the storage system includes multiple logical storage layers.

15. The computer-readable storage memory of claim 12, wherein the instructions for obtaining the data item by the first thread or the second thread include:

instructions for invoking, by the server, an application programming interface (API) of the storage system to obtain the data item, the API including a parameter for specifying one or more storage layers of the storage system from which the data item is to be obtained.

16. The computer-readable storage memory of claim 15, wherein the instructions for determining that the data item does not exist in the in-memory cache include:

instructions for invoking, by the first thread, the API with the parameter set to one or more of a plurality of data structures in the in-memory cache, each of the plurality of data structures corresponding to one of the one or more storage layers.

17. The computer-readable storage memory of claim 16, wherein the instructions for determining that the data item does not exist the in-memory cache include:

instructions for searching, by the first thread, for the data item from any of the one or more of the plurality of data structures in the in-memory cache of the first set of storage layers.

18. The computer-readable storage memory of claim 15, wherein the instructions for obtaining the data item from the persistent storage medium of the storage system include:

instructions for invoking, by the second thread, the API with the parameter set to a storage layer of the one or more storage layers that corresponds to the persistent storage medium of the storage system.

19. A system, comprising:

a processor;

a data storage system configured to store multiple data items associated with an application, the data items including key-value pairs, the data storage system including multiple storage layers;

a request receiving unit configured to receive a request to obtain a data item of the data items stored at the data storage system, the request including a key associated with the data item; and a thread pool having multiple threads to serve multiple requests for obtaining the data items, the threads including:

a first thread configured to obtain the data item from a first set of storage layers, wherein the first thread is restricted to executing queries from the first set of storage layers for which a response time of the request is below a predefined threshold, and a second thread restricted to executing queries to obtain the data item from a second set of storage layers for which the response time of the request is higher than the predefined threshold and the second thread is configured to receive the request transferred from the first thread responsive to a determination that the key does not exist in the first set of storage layers, wherein the second thread is different from the first thread the second thread configured to obtain the data item from the second set of storage layers that is different from the first set of storage layers from which the first thread is configured to retrieve the data item, wherein the request receiving unit is further configured to:

determine whether to assign the request to the first thread or the second thread based on a storage layer specified in the request.

20. The system of claim 19 wherein the multiple storage layers of the data storage system encompass a memory associated with the data storage system and a persistent storage medium of the data storage system.

* * * * *

UNITED STATES PATENT AND TRADEMARK OFFICE
CERTIFICATE OF CORRECTION

PATENT NO. : 10,387,416 B2
APPLICATION NO. : 14/080552
DATED : August 20, 2019
INVENTOR(S) : Mayank Agarwal et al.

Page 1 of 1

It is certified that error appears in the above-identified patent and that said Letters Patent is hereby corrected as shown below:

In the Claims

In Column 12, Line 8, Claim 3, delete "includes" and insert -- include --, therefor.

In Column 12, Line 34, Claim 8, after "second" delete "data".

In Column 13, Line 8, Claim 12, delete "in memory" and insert -- in-memory --, therefor.

In Column 14, Line 34, Claim 19, delete "thread the" and insert -- thread, the --, therefor.

Signed and Sealed this
Twenty-ninth Day of October, 2019

Andrei Iancu
*Director of the United States Patent and Trademark Office*